No. 731,386. PATENTED JUNE 16, 1903.
T. OLIVER.
TABULATING ATTACHMENT FOR TYPE WRITING MACHINES.
APPLICATION FILED JULY 17, 1899.
NO MODEL. 4 SHEETS—SHEET 4.
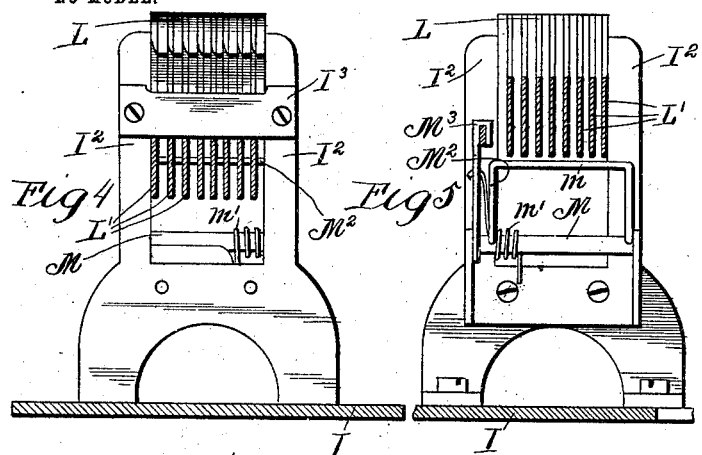
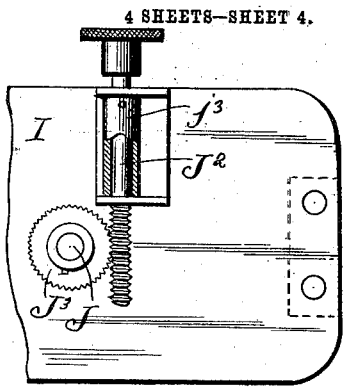
Witnesses:
C. H. Crawford
Inventor:
Thomas Oliver
by Poole & Brown
his Attys No. 731,386.

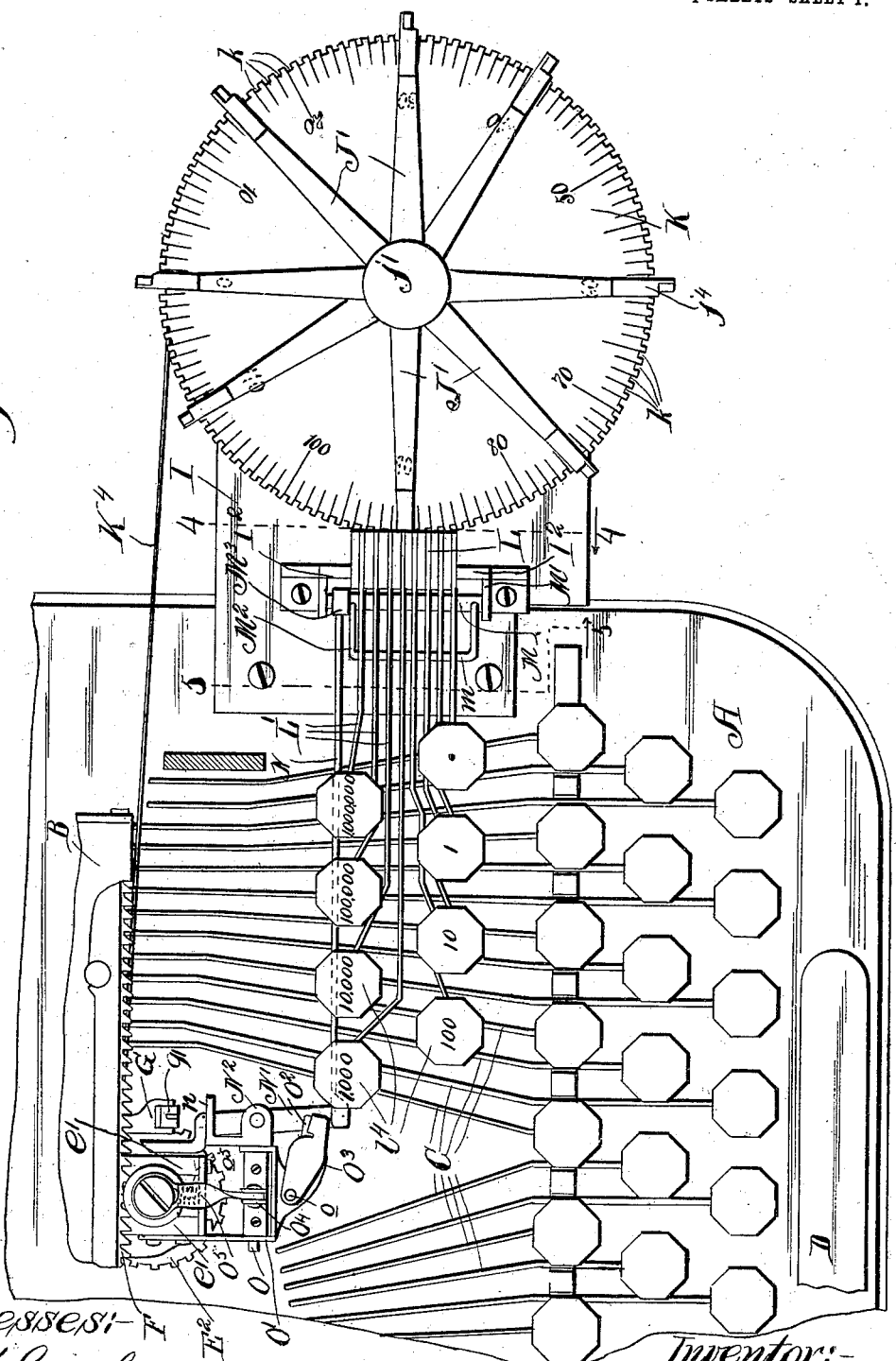

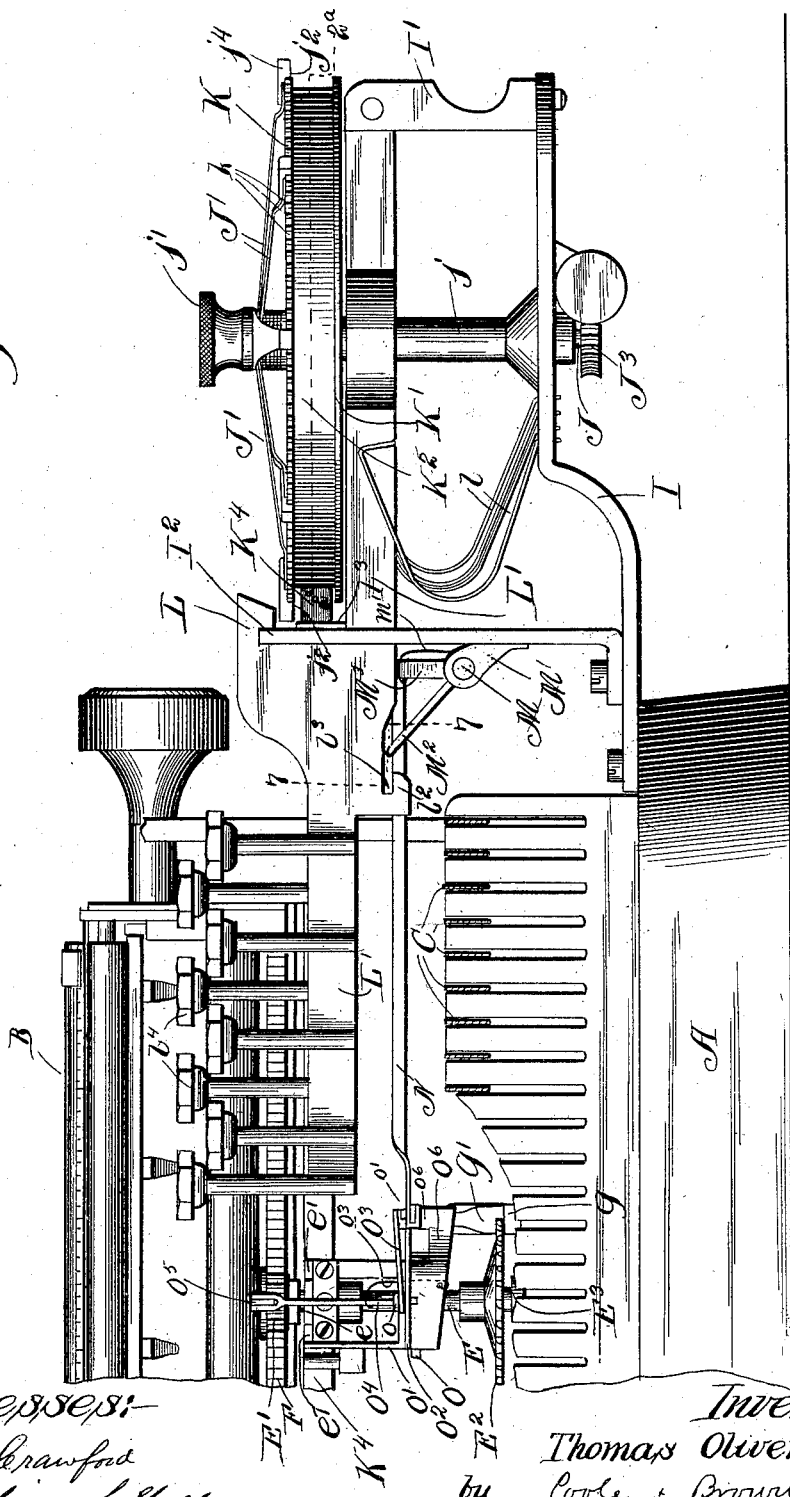

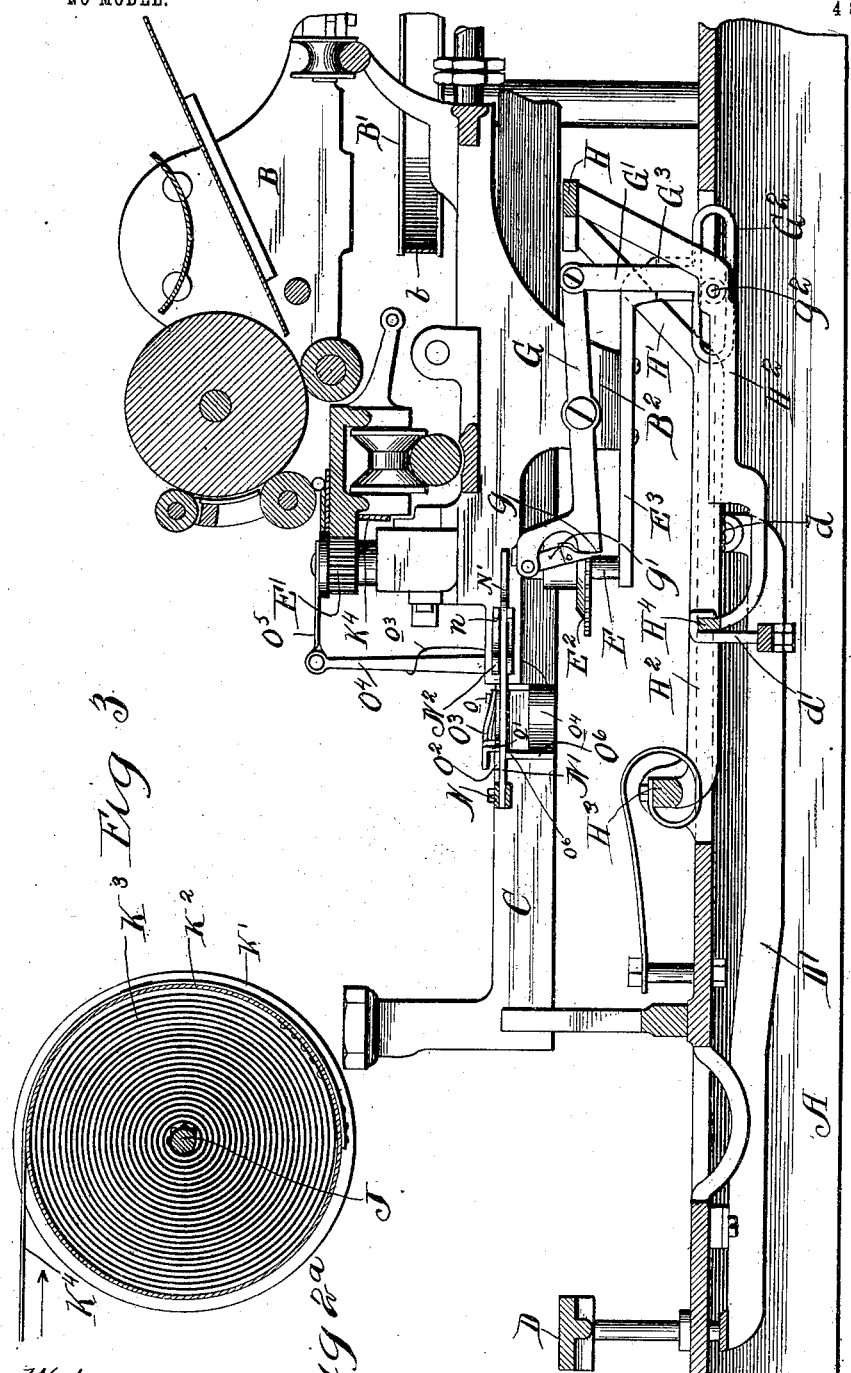

Patented June 16, 1903.

UNITED STATES PATENT OFFICE.

THOMAS OLIVER, OF WOODSTOCK, ILLINOIS.

TABULATING ATTACHMENT FOR TYPE-WRITING MACHINES.

SPECIFICATION forming part of Letters Patent No. 731,386, dated June 16, 1903.

Application filed July 17, 1899. Serial No. 724,049. (No model.)

*To all whom it may concern:*

Be it known that I, THOMAS OLIVER, of Woodstock, in the county of McHenry and State of Illinois, have invented certain new and useful Improvements in Tabulating Attachments for Type-Writing Machines; and I do hereby declare that the following is a full, clear, and exact description thereof, reference being had to the accompanying drawings, and to the letters of reference marked thereon, which form a part of this specification.

This invention relates to an attachment for type-writing machines which is designed to facilitate the work of tabulating or columnating figures of various denominations.

The invention consists in the matters hereinafter set forth, and more particularly pointed out in the appended claims.

In the drawings, Figure 1 is a fragmentary plan view, partly in section, of a type-writing machine, showing my invention applied thereto. Fig. 2 is a front elevation of the parts shown in Fig. 1 with parts thereof shown in section. Fig. $2^a$ is a horizontal section taken on line $2^a$ $2^a$ of Fig. 2. Fig. 3 is a vertical longitudinal section of the forward portion of the machine, showing the carriage, its actuating-spring drum, and the construction of the letter-spacing mechanism with the parts of my invention immediately connected therewith. Figs. 4 and 5 are transverse sections taken on lines 4 4 and 5 5 of Fig. 1. Fig. 6 is a detail of the means for adjusting the actuating-spring of the stop-arms which form a part of the attachment herein illustrated. Fig. 7 is a detail section taken on line 7 7 of Fig. 2. Fig. 8 is a side elevation of a portion of the letter-spacing mechanism, showing the parts of my invention immediately connected therewith. Fig. 9 is a similar view of said parts as seen from the opposite side thereof. Fig. 10 is a fragmentary top plan view, partly in section, of the letter-spacing mechanism and the parts of my invention immediately connected therewith, showing said parts in position for interaction in the succeeding operation of the letter-spacing mechanism. Fig. 11 is a vertical section of the sleeve which supports the inner ends of the stop-arms, showing said arms in section. Fig. 12 is a side elevation of the parts of the invention shown in Figs. 8 and 9, showing said parts in a position different from that illustrated in said Figs. 8 and 9. Fig. 13 is a view similar to that shown in Fig. 12 with the parts in a different position. Fig. 14 is a detail section taken on line 14 14 of Fig. 13. Fig. 15 is a similar view showing the parts in changed position. Fig. 16 is a plan view of the plate on which the locking-detent $O^3$ is mounted.

As shown in said drawings, A designates the base-plate of the machine. B designates the carriage, and B' the usual spring-actuated drum, which is connected with the carriage by a flexible strap $b$ and gives motion thereto in the usual manner. C C designate key-levers, and D the spacing-key, connected with the forward ends of pivoted bars D', which latter are connected at their rear ends with the letter-spacing mechanism. Said parts of the device and the letter-spacing mechanism are herein shown as made like those employed in the Oliver type-writing machine; but it will be understood that my invention may be adapted to other types of machines.

The letter-spacing mechanism consists generally of an upright escape-wheel shaft E, which carries at its upper end a pinion E', which pinion meshes with a rack F, attached to the carriage-frame. An escape-wheel $E^2$ is attached to the shaft near the lower end thereof. Said shaft engages at its lower end a bearing-aperture in the horizontal bar $E^3$, Fig. 3, which is attached to a depending arm $B^2$, which forms a part of the shifting frame. The upper end of said shaft engages a block $e$, which movably engages the arms $e'$ of a guide-bracket which is connected with the machine-frame. G designates an oscillatory escapement-lever, which is pivoted to said arm $B^2$. Said lever carries stiff and limber pawls $g$ $g'$, which are adapted for engagement with the teeth of the escapement-wheel $E^2$.

H designates a transversely-arranged vertically-movable universal or space bar located below the key-levers C near the rear part of the machine. Said space-bar is attached to the rear ends of side and intermediate arms H' $H^2$, the forward ends of which are attached rigidly to a rock-shaft $H^3$, which has bearing in the machine-frame. $H^4$ designates a transverse bar connected with said side and intermediate bars, said several parts constituting a rigid space-bar frame. The escapement-lever G is connected at its rear end to the upper end of a vertical shank or stem G', the lower end of which shank or stem is provided with a slotted yoke G², adapted to receive a stud $g^2$, which passes through the intermediate bar H² of the space-bar frame. Said vertical stem has sliding engagement with a stationary guide-block G³, which is connected with the rear end of the horizontal bar E³, to the forward end of which the shaft E is connected. Through the medium of the slotted yoke G² vertical movement of the space-bar frame is transmitted directly to the escapement-lever G, while backward and forward movement of said lever with the shifting frame is permitted without affecting the action of the escape devices. Downward movement of the type-levers C acts to give vertical movement to said space-bar H and to actuate said letter-spacing mechanism through the medium of the lever G. The space-key levers D' are pivoted at their rear ends to the base of the machine by means of pivot-studs $d$ and are connected with the transverse bar H⁴ of the space-bar frame by means of a vertical bolt $d'$, whereby downward movement of said space-key is transmitted to said space-bar.

Referring now to the parts which constitute the present invention, said parts are made and arranged as follows:

I designates a horizontal supporting-arm having the form of a flat plate attached to the machine-frame at one side thereof and projecting laterally therefrom. $j$ designates a vertical sleeve which rises from said arm between the outer end thereof and the machine-frame, within which is journaled a shaft J. Near the upper end of the shaft J is rotatably mounted a horizontal disk K. On said disk are located a series of stops $j^4$, which are circumferentially adjustable thereon and project radially from said disk. Said stops are preferably formed on the outer ends of radial arms J', which engage at their inner ends a sleeve $k'$, which rises centrally from the disk K. The shaft J will desirably extend upwardly some distance into said sleeve. $j'$ designates a screw-threaded nut applied to the outer end of said sleeve $k'$ and which holds said arms in place on said sleeve, said arms being clamped between said nut and a shoulder $k^2$ on the lower end of said sleeve. Said disk is provided with a plurality of peripheral notches $k$, which are adapted to be engaged by lugs $j^2$, which project downwardly from said stops and by means of which said stops are locked in position with respect to the disk. Said disk K is graduated to correspond with the carriage-scale, whereby said stops may be circumferentially adjusted thereon to correspond with the divisions of said carriage-scale. Said arms are made of spring metal and are so formed that the resiliency of the metal holds the lugs $j^2$ engaged with said peripheral notches and enables the outer ends of the arms to be lifted until the lugs thereon are free from the notches for the purpose of shifting or changing the position of the stops. Said disk in this instance constitutes the upper wall of an annular drum, said drum having a lower wall K' and a circumferential wall K². Within said drum is located an actuating-spring K³, which is connected at its outer end with the circumferential wall of the drum and at its inner end with the shaft J. A flexible strap or band K⁴ connects the drum with the carriage. The spring K³ acts against the tension of the carriage-actuating spring and is adapted to be adjusted so as to pull with greater or less force against the carriage-actuating spring, as desired. The means for regulating said spring K³ consists of a horizontal shaft J², which is rotatively mounted in a sleeve $j^3$, attached to the lower face of the supporting-arm I, which shaft is provided at one end with a worm-screw adapted for engagement with a worm-wheel J³, connected with the lower end of the shaft J, which projects below the supporting-arm I. The tension of said spring K³ will always be less than that of the carriage-actuating spring, so as to permit the carriage to freely move under the influence of the carriage-actuating spring. The spring K³ acts in the manner of a brake to partially arrest the movement of the carriage before it has been fully arrested by contact of the carriage-stop with the stops L.

L L designate a plurality of stop-lugs which are mounted on the supporting-arm I and are adapted to be severally moved into the path of the rotary stops $j^4$, whereby when the disk is rotated and one of the stops is brought into engagement with one of the stop-lugs movement of the carriage will be arrested. Said stop-lugs are herein shown and they will preferably be made integral with vertically-movable levers L', which are arranged transversely with respect to the key-levers C and are pivoted at their outer ends side by side to a standard I', located at the outer end of the supporting-arm I outside of the shaft J, said levers being located below the lower wall K' of the spring-drum. Said stop-lugs rise from the levers and have projecting parts which extend longitudinally of the levers radially inside of the outer ends of the stops. The inner ends of the stop-lug levers project over the key-levers C in front of the carriage and are provided with keys $l^4$, by which they may be manipulated. I² I² designate parallel vertical guides located near the inner end of the supporting-arm I, between which said stop-lug levers and the stop-lugs thereon are located. Said guides hold the stop-lugs from lateral movement in the impact of the movable stops thereon. Said vertical guides are connected near their upper ends by means of a cross-bar I³, which engages the upper margins of the stop-levers when the latter are in their normal position and serve to limit the upward movement thereof. Springs $l$, interposed between said levers and the supporting-arm I, serve to maintain said levers in their uppermost or normal position.

N' designates a horizontal lever located adjacent to the letter-spacing mechanism and which has oscillatory movement in a horizontal plane and also in a vertical plane. Said lever normally stands with its rear end at one side of and slightly above the level of the upper edge of the forward end of the escapement-lever G. Said lever N' is adapted to be horizontally oscillated when either one of the stop-lugs is moved into the path of the rotary stops to throw the rear end thereof into position for engagement with the upper margin of the forward end of the escapement-lever and is rocked on its horizontal pivot when said escapement-lever is oscillated. Provision is also made for locking said lever N' temporarily in position for engagement with the escapement-lever, as will hereinafter more fully appear. As herein shown, said lever N' is pivoted between its ends to an extension or head $N^2$ on a horizontal rock-shaft O, which latter is mounted in a bracket O', which is connected at its upper end with the bearing-bracket $e'$ for the upper end of the escape-wheel shaft. Rigid guide-lugs $n$, engaging the upper and lower surfaces of the lever N', are attached to said extension or head of the shaft O and serve to guide the rear end of said lever in its horizontal movement. In the form of spacing mechanism herein shown, which embraces a vertical escape-wheel shaft and a pinion on the upper end thereof which engages a rack on the carriage, the forward end of the lever N' is connected with said pinion in such manner that depression of said forward end of the lever, which occurs when the rear end of the lever is elevated through the operation of the escapement-lever, acts to disengage said pinion from the rack. The connections between said lever and pinion consist, as herein shown, of a vertical arm $O^4$, which is connected rigidly with and rises from said shaft in the manner shown, and a link or bar $O^5$, which connects the upper end of the bar $O^4$ with the upper end of the escape-wheel shaft, said link being slotted to permit oscillatory movement of said shaft in the usual operation of the machine. The connections between said horizontal oscillatory lever N' and the stop-lug lever L', by which the rear end of said lever N' is swung into engagement with the forward end of said escapement-lever when either one of the stop-lug levers is depressed, are made as follows:

M designates a rock-shaft which is mounted in a bracket M', connected with the inner faces of the vertical guides $I^2$. Said rock-shaft is located below the stop-lug levers and is provided with an inclined yoke $M^2$, connected rigidly with the rock-shaft. The central portion $m$ of said yoke is located transversely under the stop-lug levers L', so that when one of said levers is depressed it will act to depress said yoke and rock said shaft. To one end of said shaft is attached a rigid arm $M^3$. The outer end of said arm is connected with the forward end of the oscillatory lever N' by means of a connecting-bar N. With this construction depression of one of said stop-lug levers acts through said yoke and connecting-bar to swing the rear end of the horizontal lever N' into engagement with the forward end of the escapement-lever. A spring $m'$ is applied to the yoke $M^2$ to retract said lever N' when the latter is disengaged from the locking means provided therefor. For locking said lever N' in position for the action of the escapement-lever thereon and for locking that one of the stop-lugs which is depressed in its lowermost position devices are provided which will now be described. First describing the construction which is herein illustrated for locking the lever N' in position for engagement with the escapement-lever, these parts are made as follows:

$O^2$ designates a horizontal arm or plate which extends forwardly from the bracket O' and laterally toward the right-hand side of the machine over the outer end of the lever N' inside of the connecting-rod N.

$O^3$ designates a detent which is pivotally or loosely connected with the plate $O^2$ in a manner to permit vertical oscillatory movement of the free end of said detent by means of a headed stud $o$, inserted in the upper face of said plate through a hole in the detent, which is made larger than the stud to afford the necessary loose connection. The said detent is arranged generally in a position transverse to the lever N' and has at its free end or that adjacent to the lever a downwardly-directed tooth $o'$, adapted for engagement with the said lever in one position of the parts, said detent and its tooth affording a means by which the said lever N' is held temporarily in position for the engagement of its rear end with the escapement-lever G. The plate $O^2$ is provided at its outer end with a slot $o^2$, through which said lug extends and by which it is held in place and guided as the free end of the detent rises and falls. The tooth $o'$ is arranged to project below the plate $O^2$ in order that it may engage said lever N', which is located below said plate. Attached to the bracket O' is a flange $o^4$, which projects from the bracket and terminates in a horizontal arm $o^6$, which is arranged perpendicular to the rack-bar of the machine and beneath the forward end of the oscillating lever N'. Said horizontal arm $o^6$ is provided at its extremity with an upwardly-projecting lug $o^6$, which reaches to within a short distance of the horizontal plane of the plate $O^2$ and is provided with a vertical contact edge or shoulder facing toward the left-hand side of the machine and adapted for engagement with the side margin of the oscillating lever N' at a time when the rear end of said lever is thrown into position over the escapement-lever and as its forward end is depressed. This vertical contact edge or shoulder of the lug $o^6$ is, moreover, located slightly to the right of the left-hand side or contact edge of the tooth $o'$, so that when the forward end of the lever is in contact with said edge or shoulder it will be partially beneath the said tooth. The said lug $o^6$ is, moreover, so arranged that when the forward end of the oscillating lever N' is in its elevated position it will be free to pass over the said lug and between the upper edge of the lug and the lower surface of the plate $O^2$. These parts are so arranged that when the rear end of said lever N' is moved to the left, so as to be free from the escapement-lever, and the forward end of the said lever N' is at the limit of its throw to the right and is in its elevated position, which is the normal or usual position of said lever in the operation of the type-writer, the said forward end of the lever will stand above the level of the lug $o^6$ and in contact, or nearly so, with the under surface of the arm $O^2$ and will also stand beneath the tooth $o'$, which will at this time be in its elevated position and rest at its lower end upon said lever. The parts are, moreover, so arranged that when the forward end of the lever N' is thrown to the left, so as to bring its rear end over and in position to engage the escapement-lever when the front end of the lever is in its depressed position, the left-hand edge of the tooth $o'$ of the detent $O^3$ will be in position to engage the side edge of said lever, and thereby temporarily retain said lever with its rear end in position for engagement with the escapement-lever. The parts are further so constructed that when the escapement-lever is lifted with the effect of depressing the forward end of the lever N' said forward end of the lever as it is moved downwardly away from the tooth $o'$ will when it escapes from said tooth become engaged by the lug $o^6$, which serves to hold the said lever from swinging horizontally out of engagement with the escapement-lever until by the depression of the escapement-lever the forward end of said lever N' is allowed to rise above the top of said lug $o^6$. By reason, moreover, of the position of the left-hand or contact edge of the lug $o^6$ with respect to the tooth $o'$ as the forward end of the lever N' rises when resting in contact with the lug $o^6$ it will strike the lower end of the tooth $o'$ and lift the same, so that when the said lever N' swings from the lug $o^6$ toward the right, and thereby returns to its normal position, the tooth $o'$ will rest upon and be held in its elevated position by the said lever in the manner hereinbefore mentioned.

The means for locking the stop-lug levers and the attached lugs in their depressed positions are made as follows: Each of said stop-lug levers is provided on its lower margin near the yoke $M^2$ with a lug $l^2$, which extends longitudinally of said lever and is separated from said lever, so as to form between the same and the lever a slot $l^3$. The middle portion $m$ of said yoke stands normally just outside of the slot $l^3$. Depression of one of said levers causes said part $m$ of the yoke to move inwardly and enter such slot, being directed therein by engagement with the lower margin of the lever. When the parts are in this position, said middle part $m$ of the yoke engages the upper margin of the lug $l^2$ and prevents the lever connected therewith from rising so long as the yoke is in this position, said yoke being held in such position by engagement of the tooth $o'$ of the detent $O^3$ with the lever N'.

A spring $o^5$ is interposed between the bearing-block $e$, engaging the upper end of the escape-wheel shaft and a cross-bar connecting the arms of the guide-brackets $e'$, and which tend to hold said pinion in engagement with the rack F. A second spring $o^3$ may also be provided, which is connected at one end with the upright arm $O^4$ and at its other end with the bracket which supports the rock-shaft to which said arm is connected.

The construction heretofore described constitutes an attachment for a type-writing machine having a spacing mechanism of the general character described, and which is intended to facilitate speed and accuracy in tabulating work where it is desired to write vertical columns of words or figures. It will be understood, however, that my invention may be applied to type-writing machines having other forms of construction or spacing mechanism and that the parts immediately connected with such spacing mechanism may be varied to suit each particular case. Where columns of figures are to be written, it is usually desirable that all the units of the column shall be located under each other in a vertical line, and that the tens, hundreds, thousands, &c., of the numbers constituting said column shall be located in similar relation to each other. The device herein shown has therefore been designed for the purpose of enabling the carriage to be stopped at varying distances from a predetermined point, which will enable the figures of numbers of various denominations to be written in their proper relation with respect to a predetermined point, and with the units, tens, hundreds, thousands, &c., of the various groups of numbers constituting the column arranged vertically. In the present instance eight stop-lug levers are provided, having eight keys $l^4$. The key connected with the lever which operates the last stop-lug of the series with reference to the direction of the movement of the movable stops is provided with a designating character consisting of a decimal-point and is adapted to be depressed to move the stop-lug connected therewith into the path of the movable stops when the figures to be written are to be located on the right-hand side of a decimal-point. The key which is connected with and actuates the next adjacent stop-lug or the second from the last of the series is provided with a designating character corresponding with or representing units and is adapted to be depressed when a unit-number is to be written. The keys connected with the remainder of the stop-lugs are designated by numbers, which increase tenfold in the order of arrangement of the stop-lugs, the key connected with the first stop-lug of the series being provided with a designating character comprising seven figures, and which is adapted to be depressed when an integral number containing seven figures is to be written. With this statement of the object of the invention I will now proceed to describe the operation of the device. When it is desired to columnate figures, one of the stop-keys is depressed, and thereby through the lever L' depresses the stop-lug L connected therewith into the path of the movable stop $j^4$, said stop having been previously set on the disk-scale in a position to correspond with the position at which it is desired to locate said column. If, for instance, it is desired to write a column of decimal-numbers, the movable stop $j^4$ will be set on the disk-scale at a point to correspond with the point on the carriage-scale at which said decimal is to be printed, so that the carriage will be stopped at the proper place to print said decimal-point, and the figures will follow the same in the usual manner. When it is desired to columnate numbers which each contain a plurality of figures, one of the movable stops $j^4$ will be set on the disk-scale to correspond with the point at which the figures at the right hand of said column are to be printed, and the distance at which the carriage will be stopped in each instance in advance of such point will depend upon the number of figures in the number to be written, and such distance is determined by the depression of the lug which is devoted to the designation of said number to be written. For instance, if the number contains two figures the "ten" stop-lug will be depressed, so that said carriage will be stopped at one space from the predetermined point, which will permit the number to be written with the tens and units of the same in their proper vertical position. When one of the levers is depressed to bring the lug connected therewith into the path of the movable stops, it acts, through the yoke $M^2$, rock-shaft M, arm $M^3$, and connecting-bar N, to oscillate the lever N' to bring the rear end thereof into engagement with the forward end of the escapement-lever and at the same time moves the forward end of said lever N' into position for the tooth $o'$ of the detent $O^3$ to engage the right-hand side margin of the lever and to lock the same in this position. At this time it will be noted that the middle portion m of the yoke has entered the slot $l^3$ between the depressed lever and the lug $l^2$ connected therewith and is in engagement with the upper margin of said lug, thereby preventing said lever from rising until the yoke is released. Said middle portion of the yoke also prevents either of the other levers from being depressed while in this position. The carriage-spacing mechanism is now operated through the actuating of the space-key D, in which operation the forward end of the escapement-lever is elevated. Such elevation of the escapement-lever acts to raise the rear end of the lever N', which is permitted by reason of its connection with the rock-shaft O. Such movement is communicated, through said rock-shaft, the arm O', and link $O^5$, to the upper end of the escape-wheel shaft in a manner to release the pinion E', carried by said shaft, from the rack-bar. At this time the carriage will be moved by its actuating-spring until arrested by impact of the next adjacent stop with the depressed stop-lug. This movement of the carriage, it will be understood, will be very rapid and will take place before the spacing mechanism is restored to engagement with the carriage. Upon relieving the pressure from the space-key D the forward end of the escapement-lever will be restored to its lowermost position, and through the action of the springs $e^3$ $e^5$ the escape-wheel shaft will be swung toward the rack-bar and, through the link $O^5$, arm $O^4$, and rock-shaft, will lift the forward end of the lever N'. In the previous depression of the forward end of said lever it was moved out of engagement with the tooth $o'$ of the detent $O^3$ and into engagement with the lug $o^6$, which latter has prevented the retraction of said lever under the influence of the spring $m'$, connected with the yoke $M^2$. The inner edge of the tooth $o'$ of the detent $O^3$ being located just to the left of the inner edge of the lug $O^6$, as shown in Figs. 14 and 15, it follows that when said lever N' is in engagement with the lug $o^6$ said tooth $o'$ will rest partially over the upper face of the lever. When, therefore, the forward end of the lever is raised to its normal position, it will act by engagement with the lower end of said tooth to raise the locking-detent $O^3$, and when the said lever has passed the upper edge of the lug $o^6$ it will be free to move to the right out of engagement with the holding edge of said lug $o^6$ under the action of the spring $m'$. At this time the rear end of said lever will move laterally out of engagement with the escapement-lever, and the stop-lug lever will be free to rise under the action of the spring l and move the stop-lug connected therewith out of the path of the stop-arms, and the machine be free to operate in its usual and normal manner. The rear sides of said stops $j^4$ with reference to their direction of movement are beveled, as shown in Fig. 1, and the stop-lugs are correspondingly beveled, so that if one of said stops be located under one of the lugs which is to be depressed engagement of such inclined surfaces will act to advance such engaged stop out of the path of the stop-lug.

Many changes in the details of construction may be made without departing from the spirit of the invention, and I do not wish to be limited to such details except as herein made the subject of specific claims.

I claim as my invention—

1. The combination with the spacing-key and the letter-spacing mechanism of a type-writing machine, the latter embracing a part the movement of which effects the release of the carriage from the letter-spacing mechanism, of a tabulating attachment comprising a stop having movement corresponding with that of the carriage, a plurality of auxiliary keys which act to arrest the movement of said stop at varying distances from a predetermined point, each of said keys being adapted to establish temporary operative connection between the space-key and said movable part of the letter-spacing mechanism.

2. The combination with the space-key and letter-spacing mechanism of a type-writing machine, the latter embracing a part the movement of which effects the release of the carriage from the letter-spacing mechanism, of a tabulating attachment comprising a stop which has movement corresponding with that of the carriage, a plurality of stops on the machine-frame, a plurality of auxiliary keys which act to throw said stops into the path of the stop which moves with the carriage, and means operated by the auxiliary keys for temporarily connecting the space-key with said movable part of the letter-spacing mechanism whereby the latter is disconnected from the carriage in the next succeeding depression of the space-key and is connected with the carriage when the space-key rises.

3. The combination with the letter-spacing mechanism of a type-writing machine, of a tabulating attachment comprising a stop mechanism for arresting the carriage, and connections between said stop mechanism and the letter-spacing mechanism embracing a part which is locked in engagement with the letter-spacing mechanism when the stop mechanism is brought into position to arrest the carriage, which effects the release of the carriage from the letter-spacing mechanism in the initial movement of said letter-spacing mechanism and permits reëngagement of said carriage with the letter-spacing mechanism in the final movement of said letter-spacing mechanism.

4. The combination with a letter-spacing mechanism of a type-writing machine, of a tabulating attachment comprising a stop mechanism for arresting the carriage at varying distances from a predetermined point, and connections between the stop mechanism and the letter-spacing mechanism embracing a part which is locked in engagement with the letter-spacing mechanism upon the placing of the stop mechanism in position to arrest the carriage, which acts through the initial movement of the letter-spacing mechanism to disengage the carriage from the letter-spacing mechanism and permits the reëngagement of the carriage with the letter-spacing mechanism and restoration of the stop mechanism to its inactive position upon the final movement of said letter-spacing mechanism.

5. The combination with the letter-spacing mechanism and space-key of a type-writing machine, of a tabulating attachment comprising a stop which has movement corresponding with that of the paper-carriage, a plurality of stops on the machine-frame, a plurality of auxiliary keys acting to throw said stops on the frame into the path of the stop which moves with the carriage, a disconnecting device for releasing the letter-spacing mechanism from the carriage which is connected with the auxiliary keys and is adapted by the actuation of either of said keys to be thrown into position for engagement with a part of the letter-spacing mechanism which is moved in the depression of the spacing-key, retaining mechanism by which the disconnecting device is temporarily held in position for engagement with said part which is moved by the space-key, and releasing means operated in the rising of the space-key acting to effect the release of said disconnecting device from said retaining means.

6. The combination with a letter-spacing mechanism and a space-key of a type-writing machine, of a tabulating attachment comprising a stop which has movement corresponding with that of the paper-carriage, a plurality of stops on the machine-frame, a plurality of auxiliary keys acting to throw said stops on the frame in the path of the stop which moves with the carriage, a lever pivoted to oscillate in two planes at right angles to each other, having operative connection with the several auxiliary keys and which is connected with a part of the letter-spacing mechanism, and is adapted by the actuation of either of said keys to be thrown into position for actuation by a part of the letter-spacing mechanism which is moved in the depression of the space-key, and which on the depression of the space-key moves said lever to release the carriage from the spacing mechanism, holding means acting to retain said lever in position for engagement with said part which is moved in the depression of the space-key, and means acting to effect the release of said lever when the space-key is allowed to rise, and the lever is returned to a position permitting reëngagement of the spacing mechanism with the carriage.

7. The combination with the letter-spacing mechanism of a type-writing machine, of a tabulating attachment comprising a stop which has movement corresponding with that of the paper-carriage, a plurality of stops on the machine-frame, a plurality of auxiliary keys acting to throw said stops on the frame into the path of the stop which moves with the carriage, a rock-shaft acting on a part of the letter-spacing mechanism to release the carriage therefrom, a lever pivoted to said rock-shaft and adapted to be swung into engagement with and free from a part of the letter-spacing mechanism and which acts on the lever in a direction to turn the rock-shaft, a movable detent constructed to engage said lever when in position for engagement with said part of the letter-spacing mechanism, a stationary contact-surface located in position to retain the said lever in position for engagement with said part when said lever is swung away from said detent on the depression of the space-key, but which holds the lever in position to engage and move the detent out of its path when said lever is swung clear of said stop-surface in the rising of the spacing-key.

8. The combination with the letter-spacing mechanism and space-key of a type-writer, of a tabulating attachment comprising a stop mechanism constructed to arrest the carriage at varying distances from a predetermined point, means for temporarily locking the stop mechanism in position to arrest the carriage, and means operated by the space-key for temporarily disconnecting the carriage from the letter-spacing mechanism.

9. The combination with the space-key of a type-writing machine, of a tabulating attachment comprising a stop which moves with the paper-carriage, a plurality of stop-lugs on the machine-frame, a plurality of auxiliary keys operating to throw said stop-lugs into the path of the movable stop, means controlled by the said auxiliary keys and operated by the space-key for temporarily disconnecting the carriage from the spacing mechanism, and means for temporarily locking the stop-lugs in position for engagement with the movable stop.

10. The combination with the space-key of a type-writing machine, of a tabulating attachment comprising a stop movable with the paper-carriage, a plurality of auxiliary key-levers on the machine-frame having integral stop-lugs, either of which lugs is adapted to be moved into the path of said movable stop, means for temporarily locking either of said stop-lugs in position for engagement with the movable stop, and means controlled by said auxiliary key-levers and operated by the space-key for temporarily disconnecting the carriage from the letter-spacing mechanism.

11. The combination with the letter-spacing mechanism of a type-writing machine, of a tabulating attachment comprising a stop movable with the paper-carriage, a plurality of stop-lugs on the machine-frame either of which is adapted to be moved into the path of the movable stop, means for locking either of said lugs in its operative position, said locking means being constructed to prevent movement of the remaining lugs until the first-mentioned lug has been restored to its inactive position, and connections between the said stop-lugs and the letter-spacing mechanism.

12. The combination with the carriage and letter-spacing mechanism of a type-writing machine, the latter embracing an escapement-lever, of a stop movable with the carriage, a series of stop-lugs either of which is adapted to be moved into the path of the movable stop, and connections between said stop-lugs and letter-spacing mechanism for temporarily disconnecting the carriage from said spacing mechanism, embracing an oscillatory lever which is adapted to be temporarily locked in engagement with the escapement-lever, and through which motion is transmitted from the escapement-lever to the part of the spacing mechanism which is disconnected from the carriage.

13. The combination with the carriage and the letter-spacing mechanism of a type-writing machine, the latter embracing an escapement-lever, of a stop movable with the carriage, a series of stop-lugs, means for moving either of said lugs into the path of the movable stop and locking the same in said position, an oscillatory lever adapted for engagement with the escapement-lever, connections between said oscillatory lever and the stop-lugs which act when one of the stop-lugs is moved into the path of said movable stop to swing one end of said oscillatory lever into engagement with the escapement-lever, and means adapted for engagement with the other end of said oscillatory lever when the latter is in engagement with the escapement-lever and constructed to effect the disengagement of the letter-spacing mechanism from the carriage when said letter-spacing mechanism is operated.

14. The combination with the carriage and letter-spacing mechanism of a type-writing machine, the latter embracing an escapement-lever, of a stop movable with the carriage, a series of stop-lugs, means for moving either of said lugs into the path of the movable stop and locking the same in said position, an oscillatory lever adapted for engagement with the escapement-lever, connections between said oscillatory lever and the stop-lugs which act when one of the stop-lugs is moved into the path of said movable stop to swing one end of said oscillatory lever into engagement with the escapement-lever, means adapted for engagement with the other end of said oscillatory lever when the latter is in engagement with the escapement-lever constructed to effect the disengagement of the letter-spacing mechanism from the carriage when said letter-spacing mechanism is operated, and means for moving said oscillatory lever out of engagement with the escapement-lever and releasing the locking mechanism of the stop-lug.

15. The combination with the paper-carriage and letter-spacing mechanism of a type-writing machine, which latter embraces an escapement-lever, a rack on the carriage and a pinion engaging said rack, of a stop movable with the carriage, a series of stop-lugs, means for moving either of said lugs into the path of said movable stop, an oscillatory lever, connections between one end of said oscillatory lever and the stop-lugs which act when one of said stop-lugs is moved into the path of the movable stop to swing the other end of the lever into engagement with the escapement-lever, and connections between said oscillatory lever and said pinion.

16. The combination with the paper-carriage and the letter-spacing mechanism of a type-writing machine, the latter embracing an escapement-lever, a rack on the carriage and a pinion engaging said rack, of a stop movable with the carriage, a series of stop-lugs, means for moving either of said stop-lugs into the path of the movable stop, an oscillatory lever pivoted to swing in a plane parallel with the plane of movement of the escapement-lever, and pivoted also to swing in a plane perpendicular thereto, connections between said lever and the stop-lugs, and connections between said lever and pinion.

17. The combination with the paper-carriage and the letter-spacing mechanism of a type-writing machine, the latter embracing an escapement-lever, a rack on the carriage and a pinion engaging said rack, of a stop movable with the carriage, a series of stop-lugs, means for moving either of said lugs into the path of the movable stop, a rock-shaft, an oscillatory lever pivoted to said rock-shaft to swing in a plane perpendicular to the axis of rotation of said shaft, and connections between one end of the lever and the stop-lugs which act to move the opposite end of said lever into engagement with the escapement-lever when one of the lugs is moved into the path of the movable stop, a detent adapted for engagement with the lever to hold it in engagement with the escapement-lever, and a holding-lug adapted to engage the said lever when the same is swung away from the detent.

18. The combination with the paper-carriage and the letter-spacing mechanism of a type-writing machine, of a stop movable with the carriage, a pivoted lever which carries a stop-lug which is adapted to be moved into the path of the movable stop, a pivoted yoke engaging said lever, connections between said yoke and the letter-spacing mechanism, a lug on said lever adapted for engagement with the yoke and locking means for the yoke whereby the lever is held in position to maintain the lug in the path of the movable stop.

19. The combination with the paper-carriage and letter-spacing mechanism of a type-writing machine, the latter embracing an escapement-lever, of a stop movable with the carriage, a stop-lug on the machine-frame, a lever adapted to move said stop-lug into the path of the stop which moves with the carriage, a pivoted lever adapted for temporary engagement at one end with the escapement-lever, a pivoted yoke adjacent to the stop-lug lever, a bar connecting said yoke and pivoted lever and a lug on said stop-lug lever adapted for engagement with the yoke when the pivoted lever is engaged with the escapement-lever.

20. The combination with the paper-carriage of a type-writing machine, a carriage-actuating spring and letter-spacing mechanism, of a movable stop connected with the carriage, a spring applied to move said stop and which acts against the tension of the carriage-actuating spring, a stop-lug which is adapted to be moved into the path of said movable stop, and operative connections between said stop-lug and the letter-spacing mechanism.

21. The combination with the paper-carriage of a type-writing machine, an actuating-spring therefor, and letter-spacing mechanism, of a rotary part connected with the carriage, a stop on said rotary part, a spring applied to said rotary part which acts against the tension of the carriage-actuating spring, a stop-lug which is adapted to be moved into the path of the rotary stop, and connections between said stop-lug and the letter-spacing mechanism.

22. The combination with the paper-carriage of a type-writing machine, an actuating-spring therefor, and letter-spacing mechanism, of a shaft, a disk on the shaft which is connected with the carriage, a spring applied between said disk and the shaft and which operates against the tension of the carriage-spring, a stop-arm on said shaft which projects beyond the disk, a stop-lug adapted to be moved into the path of the stop-arm, connections between said lug and the letter-spacing mechanism, and means for turning the shaft to vary the tension of said stop-spring.

23. The combination with the paper-carriage of a type-writing machine, an actuating-spring therefor, and letter-spacing mechanism, of a rotative disk provided with peripheral notches, a spring applied to said disk which acts against the tension of the carriage-actuating spring, a spring-metal stop-arm which is mounted on the disk and projects beyond the edge of said disk and is provided with a lug adapted for engagement with the notches thereon, a stop-lug adapted to be moved into the path of said stop-arm, and connections between the lug and the letter-spacing mechanism.

24. The combination with a paper-carriage of a type-writing machine, of a carriage-actuating spring, a movable stop connected with the carriage, a spring applied to move said stop and which acts against the tension of the carriage-actuating spring, a stop-lug which is adapted to be moved into the path of said movable stop, and a key having operative connections with said stop-lug for actuating the latter.

25. The combination with the paper-carriage of a type-writing machine, of an actuating-spring therefor, a rotative part connected with the carriage, a stop on said rotative part, a spring applied to said rotative part which acts against the tension of the carriage-actuating spring, a stop-lug which is adapted to be moved into the path of the stop on said rotative part, and a key connected with said stop-lug for the purpose of moving it into the path of said stop on the rotative part.

In testimony that I claim the foregoing as my invention I affix my signature, in presence of two witnesses, this 15th day of July, A. D. 1899.

THOMAS OLIVER.

Witnesses:
C. CLARENCE POOLE,
WILLIAM L. HALL.